(12) United States Patent
Lucas et al.

(10) Patent No.: US 7,858,888 B2
(45) Date of Patent: Dec. 28, 2010

(54) METHODS AND SYSTEMS FOR METERING AND MONITORING MATERIAL USAGE

(75) Inventors: Bruce Lucas, Marlow, OK (US); Rebecca McConnell, Lone Grove, OK (US); Stephen Crain, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 70 days.

(21) Appl. No.: 11/930,756

(22) Filed: Oct. 31, 2007

(65) Prior Publication Data
US 2009/0107734 A1    Apr. 30, 2009

(51) Int. Cl.
*G01G 19/08* (2006.01)
*G01G 21/00* (2006.01)

(52) U.S. Cl. .................................. 177/136; 177/257

(58) Field of Classification Search .............. 177/229, 177/256–259, 136–141
See application file for complete search history.

(56) References Cited

U.S. PATENT DOCUMENTS

| | | | |
|---|---|---|---|
| 1,730,173 A | 10/1929 | Stearns | |
| 2,795,403 A | 6/1957 | Mead | 259/4 |
| 2,821,854 A | 2/1958 | Franke | |
| 3,010,529 A | 11/1961 | Marion | |
| 3,155,248 A | 11/1964 | Haller | 214/38 |
| 3,291,234 A * | 12/1966 | Woodburn | 177/136 |
| 3,381,943 A | 5/1968 | Miller | 259/148 |
| 3,547,291 A | 12/1970 | Batterton et al. | 214/515 |
| 3,587,760 A * | 6/1971 | Othmar et al. | 177/141 |
| 3,687,319 A | 8/1972 | Adam et al. | 214/501 |
| 3,792,790 A | 2/1974 | Brubaker | 214/501 |
| 3,854,540 A * | 12/1974 | Holmstrom, Jr. | 177/136 |
| 3,857,452 A * | 12/1974 | Hartman | 177/139 |
| 3,893,655 A | 7/1975 | Sandiford | 259/4 |
| 3,931,999 A | 1/1976 | McCain | 302/14 |
| 3,934,739 A | 1/1976 | Zumsteg et al. | 214/501 |
| 4,063,605 A | 12/1977 | Graham | |
| 4,103,752 A * | 8/1978 | Schmidt | 177/141 |
| 4,163,626 A | 8/1979 | Batterton et al. | 414/469 |
| 4,187,047 A | 2/1980 | Squifflet | 414/332 |
| 4,249,838 A | 2/1981 | Harvey et al. | 406/51 |
| 4,345,628 A | 8/1982 | Campbell et al. | |
| 4,411,325 A * | 10/1983 | Hamilton | 177/136 |
| 4,411,327 A | 10/1983 | Lockery et al. | 177/211 |
| 4,465,420 A | 8/1984 | Dillman | 414/332 |

(Continued)

FOREIGN PATENT DOCUMENTS

DE        922 422        1/1955

(Continued)

OTHER PUBLICATIONS

International Search Report for Application No. PCT/GB2010/000512 mailed on Jun. 25, 2010.

*Primary Examiner*—Randy W Gibson
(74) *Attorney, Agent, or Firm*—John W. Wustenberg; Baker Botts LLP

(57) ABSTRACT

Systems and methods for transporting and/or sensing mass of industrially useful material to identify inventory, mass or volumetric delivery rates. A load measuring apparatus comprising a framework and at least one load sensors coupled to the framework is disclosed. The load sensor senses a load applied to the framework.

16 Claims, 5 Drawing Sheets

U.S. PATENT DOCUMENTS

| | | | | |
|---|---|---|---|---|
| 4,621,972 | A | 11/1986 | Grotte | 414/477 |
| 4,634,335 | A | 1/1987 | Van Den Pol | 414/494 |
| 4,726,435 | A | 2/1988 | Kitagawa et al. | 177/187 |
| 4,775,275 | A | 10/1988 | Perry | 414/21 |
| 4,819,750 | A | 4/1989 | Carnevale | 177/256 |
| 4,844,189 | A * | 7/1989 | Shisgal et al. | 177/211 |
| 4,913,198 | A | 4/1990 | Hayahara et al. | |
| 5,127,450 | A | 7/1992 | Saatkamp | |
| 5,133,212 | A | 7/1992 | Grills et al. | |
| 5,140,753 | A | 8/1992 | Tuma | |
| 5,161,628 | A | 11/1992 | Wirth | |
| 5,205,370 | A * | 4/1993 | Paul et al. | 177/256 |
| 5,343,000 | A | 8/1994 | Griffen et al. | 177/145 |
| 5,369,222 | A * | 11/1994 | Strelioff | 177/136 |
| 5,393,936 | A * | 2/1995 | Tyhy et al. | 177/138 |
| 5,452,615 | A | 9/1995 | Hilton | |
| 5,578,798 | A * | 11/1996 | Nuyts | 177/136 |
| 5,635,680 | A * | 6/1997 | Dojan | 177/136 |
| 5,637,837 | A * | 6/1997 | Merz et al. | 177/145 |
| 5,665,910 | A | 9/1997 | Knutson et al. | |
| 5,717,167 | A | 2/1998 | Filing et al. | |
| 5,764,522 | A | 6/1998 | Shalev | |
| 5,789,714 | A * | 8/1998 | Doerksen | 177/141 |
| 5,811,737 | A | 9/1998 | Gaiski | |
| 5,811,738 | A * | 9/1998 | Boyovich et al. | 177/136 |
| 5,850,757 | A * | 12/1998 | Wierenga | 73/296 |
| 5,880,410 | A * | 3/1999 | Neuman | 177/187 |
| 5,884,232 | A | 3/1999 | Buder | |
| 6,118,083 | A * | 9/2000 | Boyovich et al. | 177/136 |
| 6,148,667 | A | 11/2000 | Johnson | |
| 6,186,657 | B1 | 2/2001 | Fuchsbichler | 366/165.4 |
| 6,242,701 | B1 * | 6/2001 | Breed et al. | 177/144 |
| 6,284,987 | B1 | 9/2001 | Al-Modiny | |
| 6,313,414 | B1 | 11/2001 | Campbell | |
| 6,384,349 | B1 | 5/2002 | Voll | |
| 6,474,926 | B2 | 11/2002 | Weiss | 414/332 |
| 6,495,774 | B1 * | 12/2002 | Pederson | 177/136 |
| 6,532,830 | B1 | 3/2003 | Jansen et al. | |
| 6,601,763 | B1 | 8/2003 | Hoch et al. | |
| 6,769,315 | B2 * | 8/2004 | Stevenson et al. | 73/862.629 |
| 6,928,886 | B2 | 8/2005 | Meusel et al. | |
| 6,948,535 | B2 | 9/2005 | Stegemoeller | 141/67 |
| 7,048,432 | B2 | 5/2006 | Phillippi et al. | 366/164.1 |
| 7,095,331 | B2 | 8/2006 | Lehrman et al. | |
| 7,202,425 | B2 * | 4/2007 | Knudsen et al. | 177/211 |
| 7,214,028 | B2 | 5/2007 | Boasso | 414/812 |
| 7,214,892 | B2 | 5/2007 | Williamson | 177/170 |
| 7,240,549 | B2 | 7/2007 | Kimbara et al. | |
| 7,267,001 | B1 | 9/2007 | Stein | |
| 7,353,875 | B2 | 4/2008 | Stephenson et al. | 166/305.1 |
| 7,528,329 | B2 * | 5/2009 | Nuyts | 177/136 |
| 2001/0038018 | A1 | 11/2001 | Bell et al. | 222/58 |
| 2003/0047387 | A1 | 3/2003 | Bogat | |
| 2003/0047603 | A1 | 3/2003 | Lustenberger et al. | |
| 2003/0202869 | A1 | 10/2003 | Posch | 414/498 |
| 2005/0110648 | A1 | 5/2005 | Lehrman et al. | |
| 2007/0125543 | A1 | 6/2007 | McNeel et al. | 166/308.3 |
| 2007/0181350 | A1 | 8/2007 | Kranz et al. | |
| 2007/0201305 | A1 | 8/2007 | Heilman et al. | 366/141 |
| 2008/0066911 | A1 | 3/2008 | Luharuka et al. | 166/283 |
| 2008/0271927 | A1 | 11/2008 | Crain | |
| 2009/0107734 | A1 | 4/2009 | Lucas | 177/25.11 |

FOREIGN PATENT DOCUMENTS

| | | |
|---|---|---|
| DE | 28 47 499 A1 | 5/1980 |
| DE | 37 17 417 A1 | 12/1988 |
| DE | 295 18 215 U1 | 5/1996 |
| EP | 0 175 543 A2 | 3/1986 |
| EP | 0 200 281 A2 | 12/1986 |
| EP | 0 200 281 A3 | 12/1986 |
| EP | 1 111 353 A1 | 6/2001 |
| WO | WO 94/19263 | 9/1994 |

* cited by examiner

METHODS AND SYSTEMS FOR METERING AND MONITORING MATERIAL USAGE

BACKGROUND

For many oilfield service operations, numerous chemicals must be used to achieve useful production from oil and gas wells, including surfactants, buffers, acids, bases, crosslinkers, breakers, etc. For most operations, chemicals are brought to the location in a concentrated form and diluted on site to achieve the desired final concentrations.

Typically, such liquid chemical concentrates are transported to the location of the well via trucks, trailers or skids, including stakebeds, float trailers, or liquid metering systems. Due to inaccurate measurement methods and other errors, it is often necessary to determine the amount of chemical in a given tank when the tank arrives. In part because the well is usually situated in a remote location, no sophisticated technique for measuring the quantity of chemical in the tank at the site of the well has been available. The measurement has traditionally required field personnel to climb above the tank and use a long measuring stick to determine the quantity of chemical in the tank.

Later, after some of the chemical in the tank has been discharged, it is often necessary or desirable to measure the amount of chemical remaining in the tank. As the instruments currently used for measuring the rate of discharge of the chemical from the tank are not sufficiently accurate, the tank is usually measured again by field personnel from above the tank.

The field personnel required to make these manual measurements are subjected to significant risks while performing the measurements. Many of the chemicals found in the tanks pose health risks, and because the field personnel are forced to work near openings in the tanks, they can be exposed to harmful chemicals. The field personnel also face the risk of falling, since manual measurements necessitate their climbing on top of the truck, trailer and/or tank.

In addition to the health and safety hazards attendant to the manual measuring method, using a measuring stick to determine the amount of chemical in the tank results in inherently inaccurate measurements. The measuring stick could be inserted at a slight angle and/or slight movements could cause the chemical to splash and produce an incorrect reading. Even under ideal conditions, a measuring stick can only be expected to determine the quantity of chemical remaining within a significant margin of error.

Traditional manual measurements require substantial time as well. Field personnel must then expend their valuable time by climbing on top of the tank, carefully measuring the depth of the chemical and climbing back down. The safety measures necessitated by the process consume additional time and human resources.

Moreover, the roads and access to such oil field locations is often very rough. Therefore, it is desirable to have a weighing apparatus that is capable of providing reliable and accurate measurements despite adverse conditions.

FIGURES

Some specific example embodiments of the disclosure may be understood by referring, in part, to the following description and the accompanying drawings.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

SUMMARY

The present invention is directed to weighing apparatuses and methods. Specifically, the present invention is directed to systems and methods for transporting and/or sensing mass of industrially useful material to identify inventory, mass or volumetric delivery rates.

In one embodiment, the present invention is directed to a load measuring apparatus comprising: a weighing platform; a first lever arm defined by a first end and a second end; a second lever arm defined by a first end and a second end; and a load sensor. The first ends of the first and the second lever arms are coupled to the weighing platform and the second ends of the first and the second lever arms are coupled to the load sensor.

In another embodiment, the present invention is directed to a load measuring apparatus comprising: a weighing platform hinged at a first end; a load sensor coupled to the weighing platform; and a support foot coupled to the load sensor. The load sensor senses a load applied to the weighing platform.

In yet another embodiment, the present invention is directed to a load measuring apparatus comprising a framework and at least one load sensors coupled to the framework, wherein the load sensor senses a load applied to the framework.

In another embodiment, the present invention is directed to method of measuring a load comprising: coupling a weighing platform at a first end to a first torque sensor; providing support to a first side of the weighing platform; applying a load to a second side of the weighing platform; and using the first torque sensor reading to determine a value of the load applied to the weighing platform.

The features and advantages of the present disclosure will be readily apparent to those skilled in the art upon a reading of the description of exemplary embodiments, which follows.

DESCRIPTION

The present invention is directed to weighing apparatuses and methods. Specifically, the present invention is directed to systems and methods for transporting and/or sensing mass of industrially useful material to identify inventory, mass or volumetric delivery rates.

Figure 1:
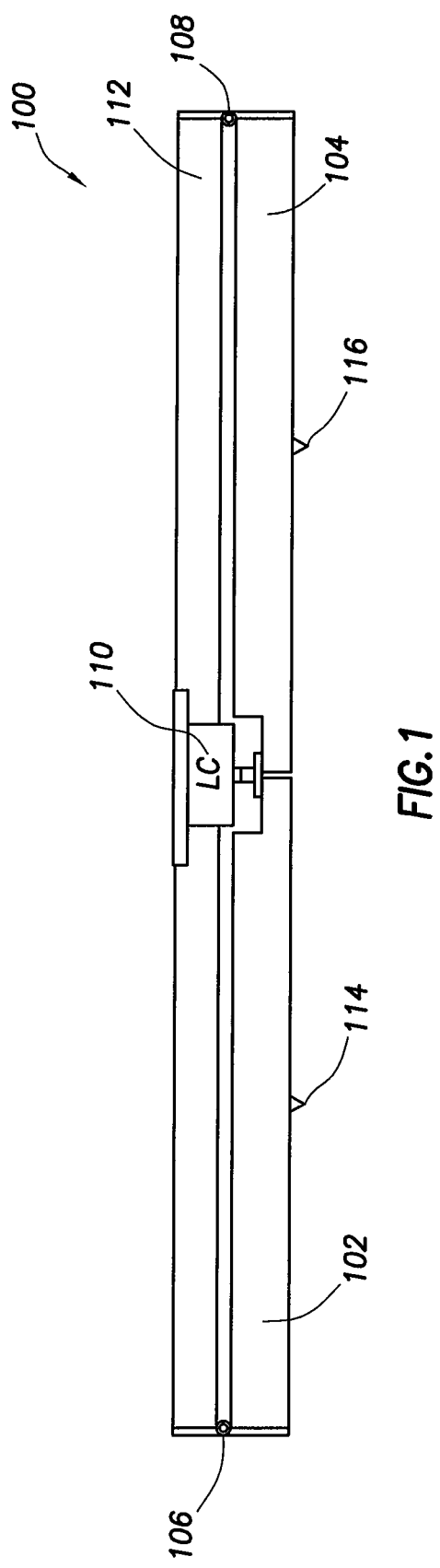
FIG. 1 is a side view of a load measuring apparatus in accordance with a first exemplary embodiment of the present invention.

The details of the present invention will now be discussed with reference to the figures. Turning to FIG. 1, a load measuring apparatus in accordance with a first exemplary embodiment of the present invention is depicted generally by reference numeral 100. The load measuring apparatus 100 comprises two lever arms 102, 104 each connected at one end to corresponding pivotal connections 106, 108. The other end of the lever arms 102, 104 is in contact with a load sensor 110. In an exemplary embodiment, load cells are used as load sensors to determine the force exerted by gravity on an object to be weighed. Electronic load cells are preferred for their accuracy and are well known in the art, but other types of force-measuring devices may be used. As will be apparent to one skilled in the art, however, any type of load-sensing device can be used in place of or in conjunction with a load cell. Examples of suitable load-measuring devices include weight-, mass-, pressure- or force-measuring devices such as hydraulic load cells, scales, load pins, dual sheer beam load cells and pressure transducers. Standard available load cells are available in various ranges such as 0-5000 pounds, 0-10000 pounds, etc.

In one exemplary embodiment, the load sensor is a compressive load cell 110 which is attached at the base and near the center of the weighing platform 112. At least one support foot 114, 116 is provided at the bottom of each lever arm 102, 104 between the load cell 110 and the pivotal connections 106, 108 to contact an existing solid surface such as a concrete floor, truck bed, frame support, etc (not shown). As would be appreciated by those of ordinary skill in the art, with the benefit of this disclosure, the support foot may comprise any component that is used to provide support and is not limited to any specific shape or structure. Accordingly, a load effectively applied normal to the weighing platform 112 surface in the area between the two support feet 114, 116 produces a proportional force on the load cell 110 which generates a signal proportional to the applied normal load.

In one exemplary embodiment the support feet 114, 116 may be replaced with pinned supports and the load button at the load cell may be replaced with a pin connection. In this embodiment, any loads applied to the weighing platform 112 outside the pivots produce positive and negative forces that sum to a proportionally representative force at the load cell 110 regardless of position.

Figure 2:
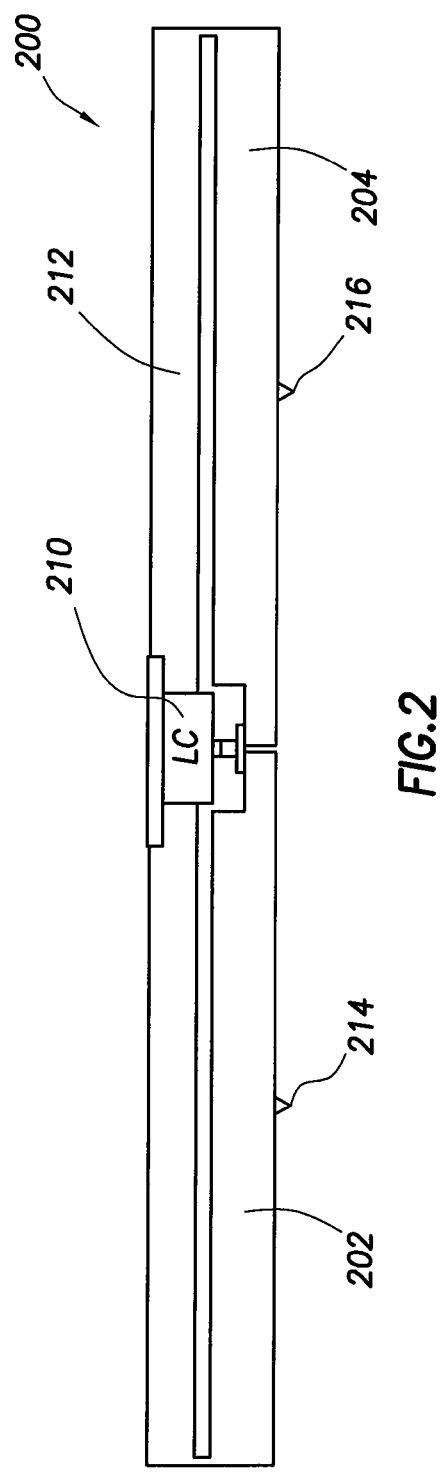
FIG. 2 is a side view of a load measuring apparatus in accordance with a second exemplary embodiment of the present invention.

FIG. 2 depicts a load measuring apparatus in accordance with a second embodiment of the present invention denoted with reference numeral 200. In the second embodiment, the pivotal connections 106, 108 are replaced with deformable ends. As a result, the weighing platform 212 and the lever arms 202, 204 form a single piece, resting on support feet 214, 216.

Figure 3:
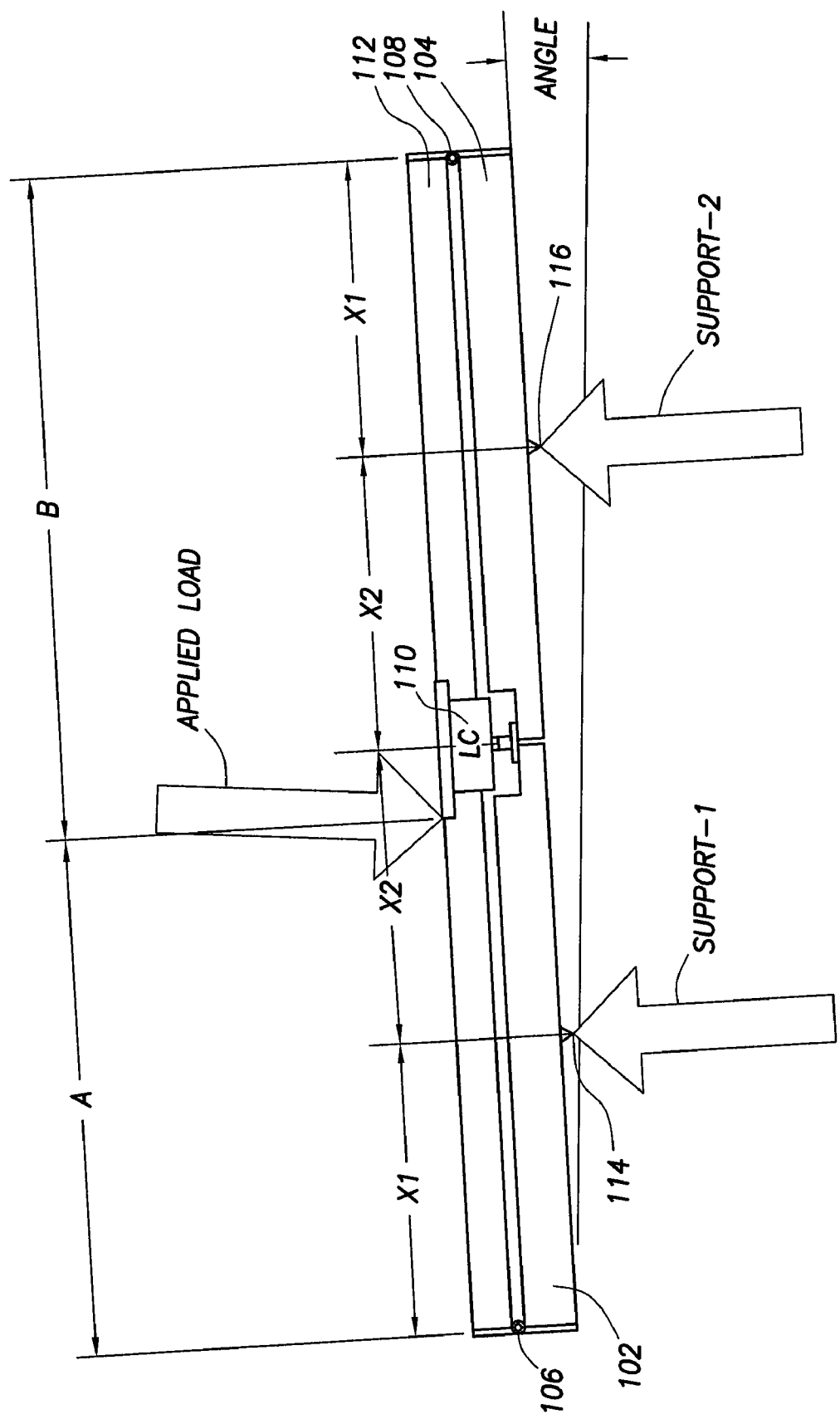
FIG. 3 is a side view of the first exemplary embodiment of the present invention depicting the different forces acting on the apparatus when in operation.

A better understanding of operation of an embodiment of the present invention may be obtained by turning to FIG. 3. As depicted in FIG. 3, the distance between each of the support feet 114, 116 and the corresponding pivotal connection 106, 108 is labeled "X1" and the distance between each support foot 114, 116 and the load cell 110 is labeled as "X2". Similarly, the distance between the point of application of the load and a first pivotal connection 106 is labeled "A" and the distance between the point of application of the load and a second pivotal connection 108 is labeled "B". Finally, the deviation of the weighing platform 112 and lever arms 102, 104 from the level axis is denoted as "Angle". A mechanical analysis of the invention in which the load is assumed to be applied between the support feet demonstrates that the resulting force on the load cell 110 can be calculated with the following equation:

$$\text{Force}_{Load\ Cell} = \text{Applied Load} \times \{2 \times X1/(A+B) \times \text{Cos(Angle)}\}$$

As would be appreciated by those of ordinary skill in the art, with the benefit of this disclosure, the force at the load cell 110 is independent of the point of application of the load on the platform between the supports. Moreover, the error from any slope is equivalent to the ratio of the cosine of the angle of the weighing platform 112 from the level axis and the equation above accounts for any such errors.

In one exemplary embodiment a tilt sensor may be included to correct the errors resulting from deviations of the weighing apparatus from the level axis. In another exemplary embodiment, it may be appropriate to use a means to approximately level the weighing platform 112 rather than add a tilt sensor. However, as would be appreciated by those of ordinary skill in the art, with the benefit of this disclosure, the error is less than 0.5% for angles of less than 5 degrees. Because the resulting error is often minute, in many applications no angle sensor is required.

In a load measuring apparatus in accordance with an embodiment of the present invention the load sensor 110 and pivotal connections 106, 108 are attached to the weighing platform 112 and the load is transmitted to the lever arms 102, 104 via the support feet 114, 116. As a result, the position of the support feet 114, 116 determines the ratio of the load applied to the weighing platform 112 to force applied to the load cell 110. Consequently, the support feet 114, 116 may be designed to be adjustable in order to allow a variation of the capacity or resolution of the load measuring apparatus. As a result, the ability to adjust the support feet enables the use of a single capacity sensor for multiple ranges which can produce higher resolution at lower loads or greater range and lower resolution at larger loads. Additionally, adjustable support feet define the point of load application, enable mechanical ranging of the sensor and eliminate the requirement for a base plate. These improvements reduce the weight, profile height and manufacturing costs of the load measuring apparatus while raising the electronic sensing components above any materials or liquids that may accumulate beneath the platform to provide improved overall reliability.

A load measuring apparatus may be used to transport containers filled with material that is industrially useful to oil field locations. In one exemplary embodiment a transport locking mechanism (not shown) may be provided to protect the load sensor from extreme shock loads during transportation. The lock would carry the loads between the weighing platform 112 and the lever arms 102, 104 in place of the load sensor. Consequently, the lock would lift and hold the load sensor off the lever arms 102, 104 thereby preventing contact between the load cell 110 and the lever arms 102, 104. The lock may then be disengaged upon arrival at the destination to allow contact between the lever arms 102, 104 and the load cell 110.

In other exemplary embodiments, tie down hooks, straps or similar features (not shown) may be added to the invention to hold down the containers being transported or hold the support feet 114, 116 in place on a truck, ship, train or other surface without influencing the weight sensing accuracy or ability to measure loads. As would be appreciated by those of ordinary skill in the art, with the benefit of this disclosure, other isolation methods and materials may be utilized in all or any part of the weighing apparatus assembly disclosed herein to reduce stresses and increase reliability. Because such methods and materials are known to those skilled in shock and vibration isolation design and do not change the concept of the present invention, they will not be discussed in detail.

Figure 4:
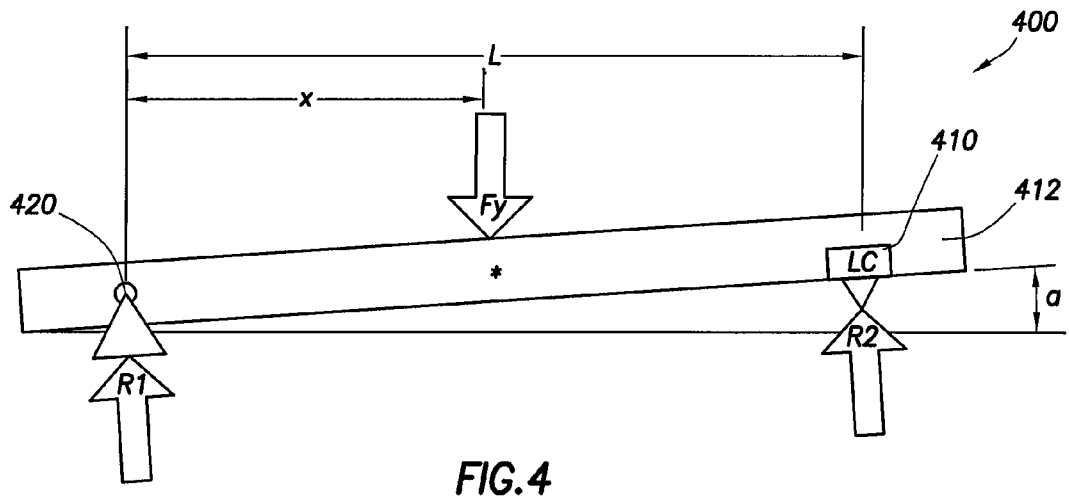
FIG. 4 is a side view of a third exemplary embodiment of a load measuring apparatus of the present invention depicting the different forces acting on the apparatus when in operation.

FIG. 4 depicts a third embodiment of the present invention shown generally with reference numeral 400. In this exemplary embodiment, the load cell 410 is located on one side and a hinge 420 is located on the opposite side of the weighing platform 412. The distance from the load cell 410 to the hinge 420 is labeled "L", the distance between an applied load "Fy" and the hinge 420 is labeled "X" and the angle of the weighing platform 412 from the level is labeled "a". As would be appreciated by those of ordinary skill in the art, with the benefit of this disclosure, when a load Fy is applied to the weighing platform 412, the force R2 at the load cell 410 can be calculated using the following equation:

$$R2 = Fy \times \text{Cos}(a) \times X/L$$

As would be appreciated by those of ordinary skill in the art, with the benefit of this disclosure, in one exemplary embodiment, the weighing platform 412 may be a tanker trailer. In this exemplary embodiment, the load cell 410 may be installed in one of a tanker trailer axle or a truck fifth wheel. Moreover, the tanker trailer axle or the truck fifth wheel may operate as the hinge 420.

Figure 5:
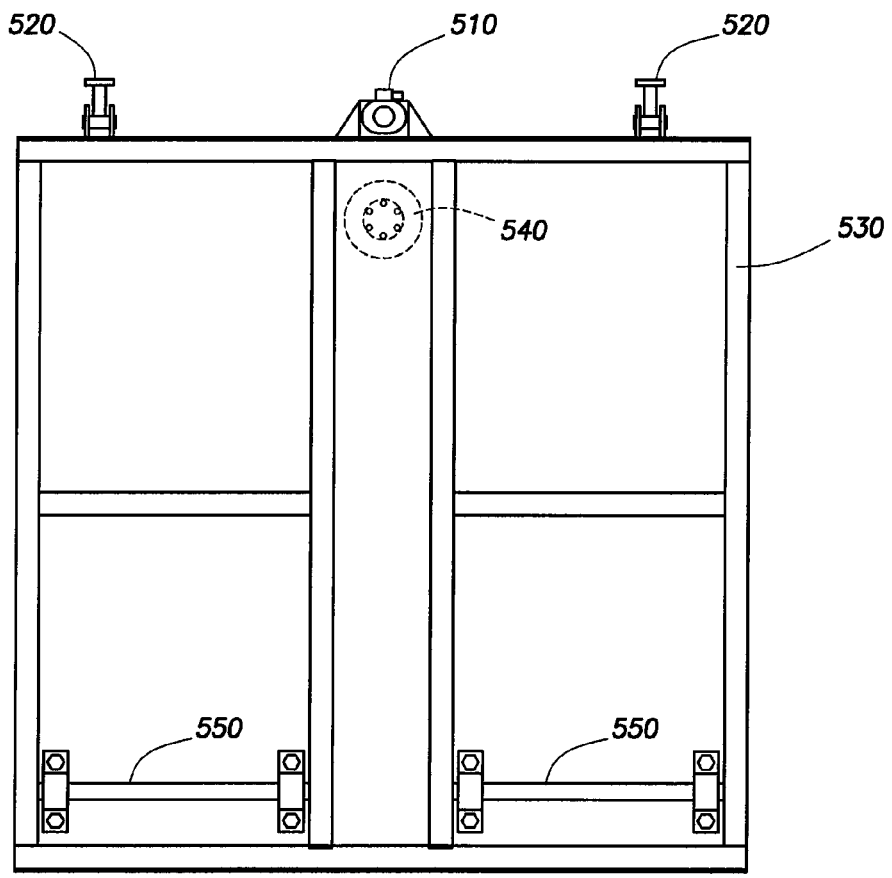
FIG. 5 depicts a top view of a load measuring apparatus in accordance with the third exemplary embodiment of the present invention.

FIG. 5 depicts a top view of the third exemplary embodiment of the weighing apparatus which includes a lifting device 510 for setting road feet 520 which support the frame 530 during transport so that no shock loads are applied to the load cell 540 while the unit is in transport mode. Specifically, when in transport mode, the lifting device 510 lifts the frame 530 which is hinged at the support feet 550. The load measuring apparatus will then rest on the setting road feet 520. This embodiment is sensitive to the load position and changes in the angles influence the effective load position by shifting the center of the mass. As would be appreciated by those of ordinary skill in the art, with the benefit of this disclosure, these errors can be corrected by mathematical models that are incorporated into a processor in the weight display.

Figure 6:
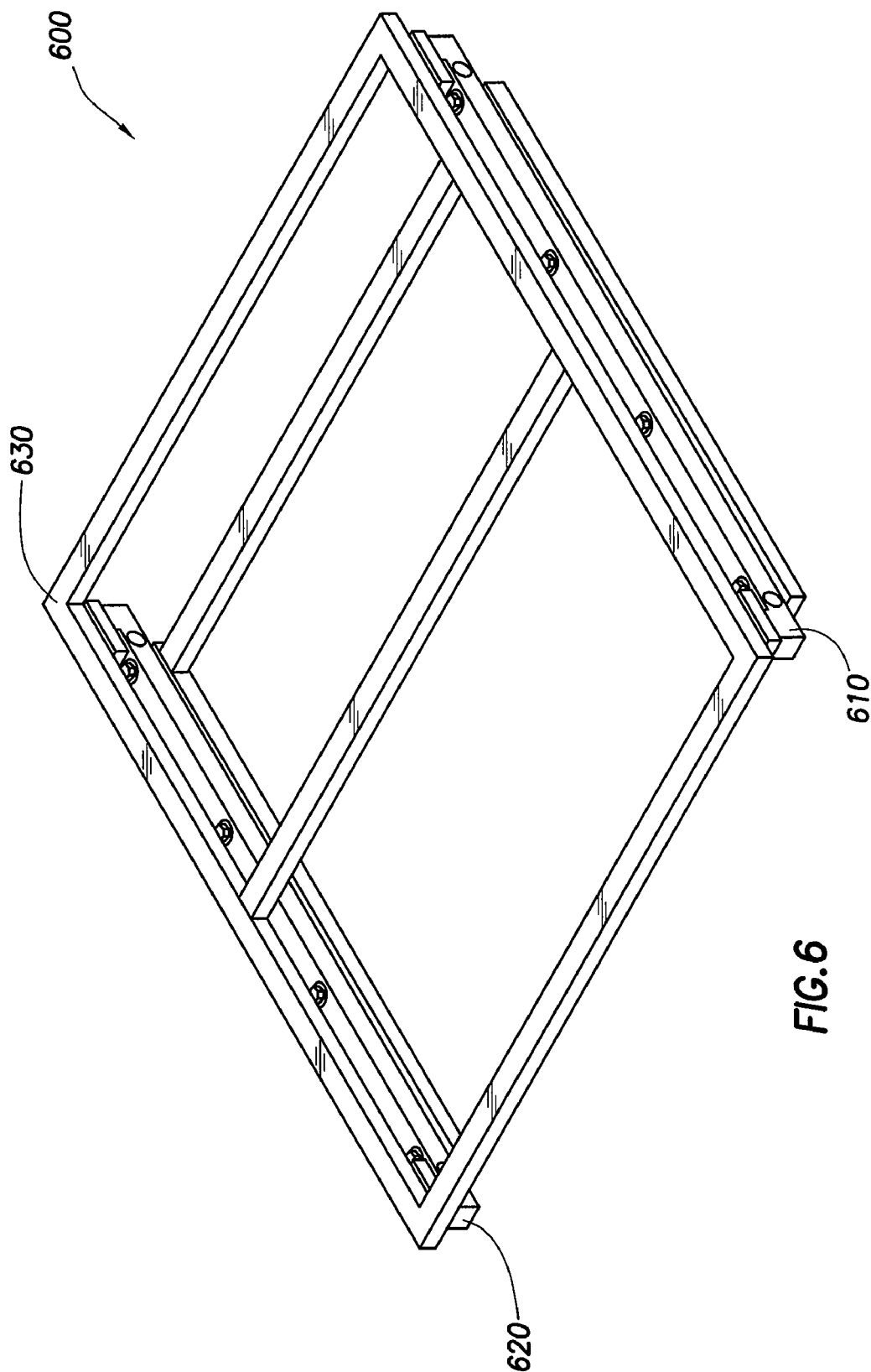
FIG. 6 depicts a perspective view of a load measuring apparatus in accordance with a fourth exemplary embodiment of the present invention.

FIG. 6 depicts a fourth exemplary embodiment of the present invention shown generally with reference numeral 600. In this embodiment two load cells 610, 620 are used to sense the entire load. As would be appreciated by those of ordinary skill in the art, with the benefit of this disclosure, more than two load cells may be used in a similar arrangement to sense the weight on the load measuring apparatus. The frame 630 holding the materials to be weighed is placed in contact with the load cells 610, 620.

The load cells 610, 620 are arranged in a symmetrical pattern to reduce sensitivity to the position of the load for precision measurements. When multiple weighing devices are used, they may be arranged specifically to counter any undesired forces or moments that may cause the weighing apparatus to report an inaccurate weight. In particular, the weighing devices should be arranged in a symmetrical configuration such that for each load cell affected by the undesired force, another load cell produces an opposite response. When the forces measured by the weighing devices are summed to determine the total weight, the impact of the undesired force will be reduced or cancelled out by the equal and opposite measurements of the force by separate weighing devices.

Figure 7:
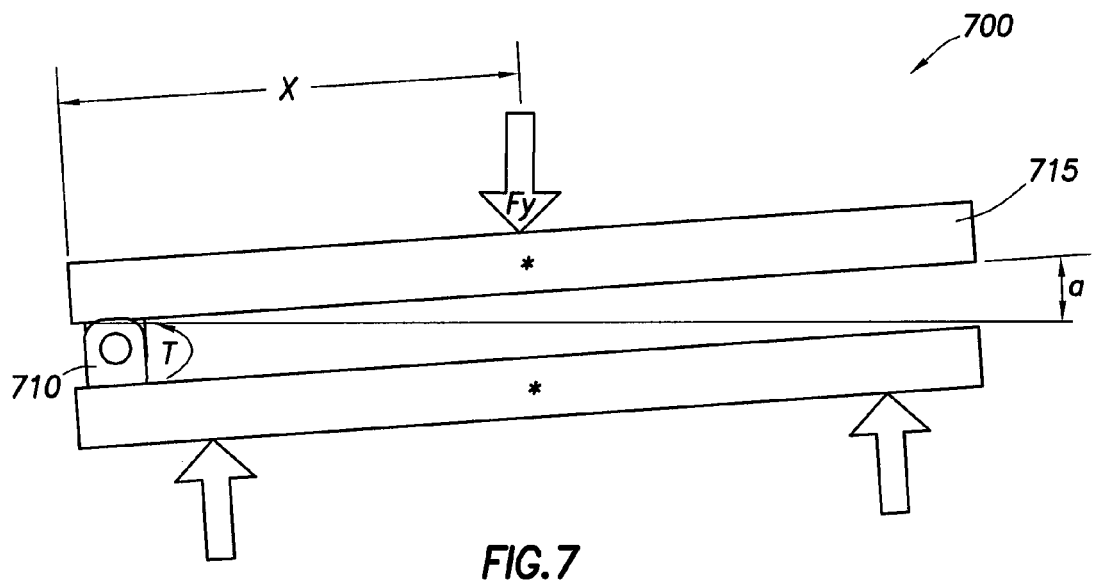
FIG. 7 depicts a side view of the forces acting on a load measuring apparatus in accordance with a fifth exemplary embodiment of the present invention.

FIG. 7 shows a fifth exemplary embodiment of the present invention depicted generally with reference numeral 700. The load measurement apparatus 700 is similar to the embodiment depicted in FIG. 4 except that the load cell 410 and pivot 420 have been replaced with a torque sensor 710. The torque sensor 710 restrains rotation at the pivot and senses the amount of torque applied at the connection. When a load "$F_y$" is applied at a distance "X" from the torque sensor 710 on the weighing platform 715 and the weighing platform 715 is at an angle, "a", from the level axis, the amount of torque, "T", is determined by the following equation:

$$T = Fy \times X \times \text{Cos}(a)$$

As a result, once the amount of torque sensed by the torque sensor is known, the amount of load, $F_y$, may be determined using the following equation:

$$Fy = T/(X \times \text{Cos}(a))$$

Figure 8:
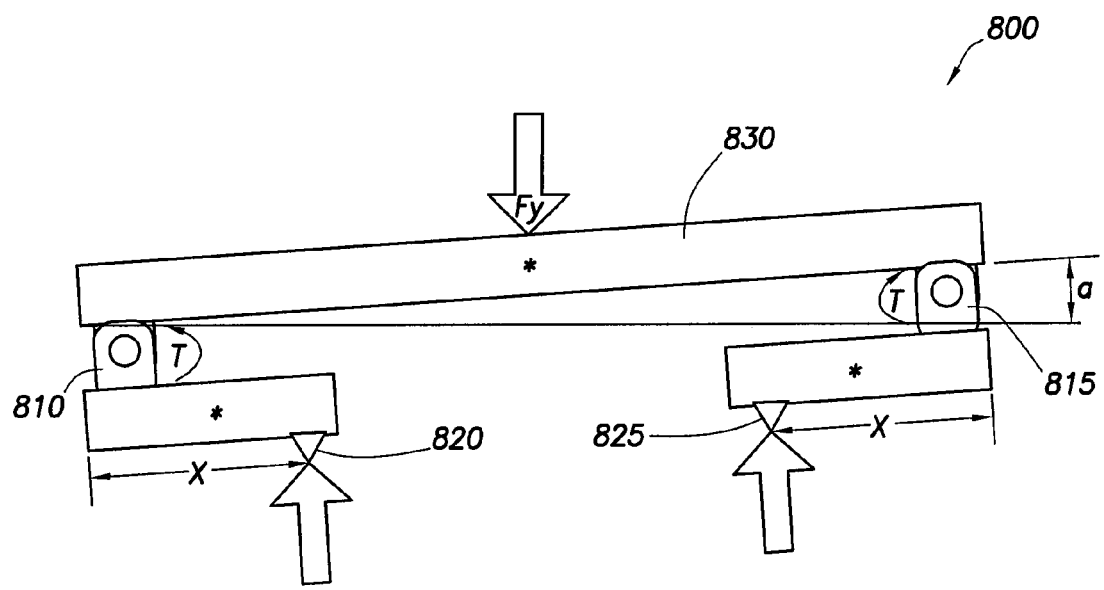
FIG. 8 depicts a side view the forces acting on a load measuring apparatus in accordance with a sixth exemplary embodiment of the present invention.

Similarly, FIG. 8 depicts a sixth exemplary embodiment of the present invention 800 similar to that shown in FIG. 1 except that the load cell 110 and pivotal connections 106, 108 have been replaced with torque sensors 810, 815. The torque sensors 810, 815 restrain rotation at the pivotal connections and sense the amount of torque applied at the connections. In this exemplary embodiment 800 the torque is caused by the support feet 820, 825 which are located at a distance "X" from the torque sensors 810, 815 resisting the force "$F_y$" applied to the weighing platform 830. The torque, "T", at each sensor is proportional to the length (X) of the lever from torque sensor to support foot and the total torque, "ΣT", is representative of the total force applied. The total torque can then be calculated with the following equation:

$$\Sigma T = T_{Right} + T_{Left} = Fy \times X \times \text{Cos}(a)$$

Therefore, once the total amount of torque, ΣT, sensed by the torque sensor is known, the applied load, Fy, can be determined using the following equation:

$$Fy = \Sigma T/(X \times \text{Cos}(a))$$

In one exemplary embodiment, the storage units and the load measuring apparatus are attached to a vehicle. Alternatively, the storage units may not be fixed to the vehicle, in which case the load measuring apparatus may be attached to the trailer, may be attached to the storage units, may be integrated into a cradle which holds the tank mounted on the vehicle, or may be mobile and able to be moved into various configurations depending on the needs of a particular shipment. In yet another embodiment, the load measuring apparatus may be attached to one or more mobile pallets or scales. The storage units may then be placed on the pallets when loaded in the vehicle.

While the load and degree of deviation measurements contemplated by the present invention may be taken manually, an automatic means of processing the information generated by the measurement devices is desirable. In one embodiment, a computer system is electrically coupled to the load measuring apparatus and/or the level measuring devices and receives electronic signals from those devices. In another embodiment the signals may be filtered to reduce noise using hardware or software in the computer system or before the signal is fed into the computer system. The computer system can be configured to automatically perform calculations to compensate for off-axis forces or moments and the degree of deviation from the level position.

The computer system may also be configured to record multiple weight measurements over a given period of time. The computer system may then be used to calculate the rate of discharge by, for example, dividing the difference of any two weight measurements by the time elapsed between the measurements. In some embodiments, the computer system will further be operable to compare the calculated discharge rate with the desired discharge rate and to automatically increase or decrease the actual discharge rate by communicating with or otherwise manipulating the discharge control mechanism. By performing this adjustment substantially in real-time, the accuracy of the actual discharge rate is enhanced.

A computer system adds further functionality in contexts, such as well service operations, where the substance contained in the storage unit is to be mixed with another substance in a specified ratio. The computer system may monitor the weights and discharge rates of multiple storage units and be operable to adjust the discharge rates (via multiple discharge control mechanisms) to conform to a series of predefined or user-specified ratios. The increased accuracy of the weight-based system disclosed herein facilitates closer adherence to the desired ratios, especially when the discharge rates are adjusted substantially in real-time.

Although the present invention is described with relation to oil field applications, as would be appreciated by those of ordinary skill in the art, with the benefit of this disclosure, the apparatus and methods described herein may be used in any other application where it would be desirable to measure the weight of a substance. The present invention could easily be adapted for any industrially useful substance, including liquids, dry materials, slurries, solutions or suspensions. In another embodiment, for example, the storage units being weighed may contain dry gel polymer. The dry gel polymer may also be used as an additive during a well service operation, but the present invention is not limited to chemical inventory management in well service operations. The present invention may be applied in any circumstance when the weight, mass, volume or rate of discharge of an industrially useful substance is desired, especially when the measurement must be taken at a remote location. The present invention may also be adapted to accommodate mixtures such as cement or granular substances such as sand.

Moreover, as would be appreciated by those of ordinary skill in the art, with the benefit of this disclosure, each embodiment of the present invention may also include temperature, angle, fluid density and fluid level sensors in order to correct environmental factors that may influence accuracy and/or to establish the volume of fluid that is contained and/or delivered. Additionally, each embodiment of the present invention may include roading supports or locks to eliminate shock loads from damaging the transducers, load bars, strain gauges or other load sensors used to convert the mass to an electrical signal.

What is claimed is:

1. A load measuring apparatus comprising:
   a vehicle;
   a weighing platform coupled to the vehicle;
   a transportable container removably securable to the weighing platform;
   a first lever arm defined by a first end and a second end;
   a second lever arm defined by a first end and a second end;
   a first support foot on the first lever arm and a second support foot on the second lever arm; and
   a load sensor;
   wherein the weighing platform is transportable by the vehicle;
   wherein the weighing platform is operable to weigh the transportable container;
   wherein the first ends of the first and the second lever arms are coupled to the weighing platform and the second ends of the first and the second lever arms are coupled to the load sensor;
   wherein the first support foot is located between the first end of the first lever arm and the second end of the first lever arm; and
   wherein the second support foot is located between the first end of the second lever arm and the second end of the second lever arm.

2. The apparatus of claim 1, wherein a position of the first support foot on the first lever arm and a position of the second support foot on the second lever arm are adjustable.

3. The apparatus of claim 1, further comprising a first pinned support on the first lever arm and a second pinned support on the second lever arm.

4. The apparatus of claim 3, wherein the position of the first pinned support on the first lever arm and the position of the second pinned support on the second lever arm are adjustable.

5. The apparatus of claim 1, wherein the first lever arm and the second lever arm are coupled to the weighing platform through a pivotal connection.

6. The apparatus of claim 1, wherein the weighing platform, the first lever arm and the second lever arm form a single piece.

7. The apparatus of claim 1, wherein a distance from the first end of the first lever arm to the load sensor is substantially equal to a distance from the first end of the second lever arm to the load sensor.

8. The apparatus of claim 1, further comprising one of a temperature sensor, an angle sensor, a fluid density sensor or a fluid level sensor coupled to one of the weighing platform, the first lever arm or the second lever arm.

9. The apparatus of claim 1, wherein the load sensor is an electronic load cell.

10. The apparatus of claim 1, further comprising a locking mechanism coupled to the load sensor, wherein the locking mechanism isolates the load sensor from the first lever arm and the second lever arm.

11. The apparatus of claim 1, further comprising a computer system for analyzing data obtained from the load sensor.

12. A load measuring apparatus comprising:
    a vehicle;
    a weighing platform coupled to the vehicle; and
    a transportable container removably securable to the weighing platform;
    wherein the weighing platform is hinged at a first end;
    a load sensor coupled to the weighing platform;
    a support foot coupled to the load sensor; and
    a lifting device coupled to the weighing platform, wherein the lifting device protects the load sensor from shock loads;
    wherein the load sensor senses a load applied to the weighing platform by the transportable container.

13. The apparatus of claim 12, wherein the load measuring apparatus rests on a roading foot when lifted by the lifting device.

14. The apparatus of claim 12, wherein the load sensor is positioned at a second end of the weighing platform.

15. The apparatus of claim 12, wherein the load sensor is an electronic load cell.

16. A method of measuring a load comprising:
    coupling a weighing platform to a vehicle;
    removably securing a transportable container to the weighing platform;
    coupling the weighing platform at a first end to a first torque sensor;
    providing support to a first side of the weighing platform;
    applying a load to a second side of the weighing platform;

using the first torque sensor reading to determine a value of the load applied to the weighing platform by the transportable container;

coupling the weighing platform at a second end to a second torque sensor;

coupling a first lever arm to the first torque sensor;

coupling a second lever arm to the second torque sensor;

providing support to the first lever arm and the second lever arm; and determining a value of the load applied to the weighing platform by the transportable container from a sum of the torque sensed by the first torque sensor and the torque sensed by the second torque sensor.

* * * * *